United States Patent
Nakajima et al.

(10) Patent No.: US 6,470,984 B1
(45) Date of Patent: Oct. 29, 2002

(54) HYBRID VEHICLE DRIVE APPARATUS

(75) Inventors: Minoru Nakajima, Saitama (JP); Tatsurou Horie, Saitama (JP); Kenji Fukuda, Saitama (JP); Akiyoshi Shimada, Saitama (JP); Hirohisa Ogawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/609,873

(22) Filed: Jul. 3, 2000

(30) Foreign Application Priority Data

Jul. 5, 1999 (JP) .............................. 11-191091

(51) Int. Cl.⁷ ................................................ B60K 1/00
(52) U.S. Cl. ....................................... 180/65.2; 310/218
(58) Field of Search ................................ 310/218, 216, 310/254; 180/65.2

(56) References Cited

U.S. PATENT DOCUMENTS

| | | | | |
|---|---|---|---|---|
| 3,652,889 A | * | 3/1972 | Reece et al. ................. | 310/218 |
| 3,849,683 A | * | 11/1974 | Leistner ....................... | 310/218 |
| 4,712,035 A | * | 12/1987 | Forbes et al. ............. | 310/218 X |
| 4,818,911 A | * | 4/1989 | Taguchi et al. .......... | 310/218 X |
| 4,866,317 A | * | 9/1989 | Katayama | |
| 4,961,016 A | * | 10/1990 | Peng et al. | |
| 5,842,534 A | * | 12/1998 | Frank ........................ | 180/65.2 |
| 5,942,879 A | * | 8/1999 | Ibaraki .................. | 180/65.2 X |
| 6,034,461 A | * | 3/2000 | Sun ............................. | 310/218 |
| 6,066,905 A | * | 5/2000 | Wright et al. ............... | 310/179 |
| 6,083,139 A | * | 7/2000 | Deguchi et al. ........ | 180/65.2 X |
| 6,209,672 B1 | * | 4/2001 | Severinsky ................. | 180/65.2 |
| 6,219,900 B1 | * | 4/2001 | Suzuki .................... | 310/218 X |

FOREIGN PATENT DOCUMENTS

| JP | 1151741 | * | 6/1989 |
|---|---|---|---|
| JP | 833262 | * | 2/1996 |
| JP | 9-156388 | | 6/1997 |

\* cited by examiner

*Primary Examiner*—Brian L. Johnson
*Assistant Examiner*—Bryan Fischmann
(74) *Attorney, Agent, or Firm*—Arent Fox Kintner Plotkin & Kahn

(57) ABSTRACT

The invention provides a hybrid vehicle drive apparatus in which a stator of a motor used under a high temperature environment can be simply and securely fixed to a motor housing. An AC motor is connected to a crank shaft between an internal combustion engine and a transmission, the AC motor is provided with a motor housing connected to each of the internal combustion engine and transmission, a stator constituted by a plurality of stator pieces arranged to form a ring shape, each of the stator pieces constituted by stator core teeth, a stator hold ring opening portion corresponds to an outer peripheral shape of the stator and is press-fitted to the opening portion, and the stator hold ring is fixed to the motor housing. A coefficient of thermal expansion of the stator substantially coincides with a coefficient of thermal expansion of the stator hold ring.

2 Claims, 13 Drawing Sheets

HYBRID VEHICLE DRIVE APPARATUS

BACKGROUND OF THE INVENTION

1. Field of the Invention

The present invention relates to a hybrid vehicle drive apparatus for driving a vehicle by both or any one of a driving force of an internal combustion engine and a drive force of an alternating current motor, and more particularly to a hybrid vehicle drive apparatus in which the alternating current motor is connected to a crank shaft between the internal combustion engine and a transmission.

2. Description of the Related Art

As a drive system for a hybrid vehicle, a system for driving a vehicle by both or any one of a drive force of an internal combustion engine and a drive force of an alternating current motor has been disclosed in Japanese Patent Application Laid-Open (JP-A) No. 9-156388. A stator employed in the alternating current motor for the hybrid vehicle is generally structured such that a multiplicity of ring-like silicone steel plates, each having a plurality of stator teeth protruding from an inner peripheral end portion of a ring-like stator core toward a center along a circumference, are laminated so as to constitute a stator core, and each stator coil is wound around the laminated portion of each stator tooth.

In order to improve a space factor of the stator coil wound around the stator tooth, it is desirable that the stator coil is closely wound around each of the stator teeth, and it is desirable that the stator coil is independently wound around each of the stator teeth. However, in the conventional stator shape, since the stator teeth are fixedly arranged adjacent to each other, it is impossible to closely wind the stator coil around each of the stator teeth with passing through a gap in each of the stator teeth, so that a high space factor cannot be obtained.

In order to solve the problem mentioned above, there can be considered a structure in which a stator core is constituted by arranging independent stator pieces corresponding to a predetermined angle (for example, corresponding to one slot) so as to form a ring shape, and a stator coil is wound around each of the stator pieces.

In general, in the case of fixing a steel stator to an aluminum motor housing, there is employed a fixing method utilizing the fact that a coefficient of thermal expansion of the aluminum is greater than a coefficient of thermal expansion of the steel. That is, an opening having an inner diameter slightly smaller than an outer peripheral size of the stator is formed at the aluminum motor housing, and the stator is press-fitted to the opening after the inner diameter of the opening is expanded by heating the motor housing.

However, in the structure in which the alternating current motor is arranged between the internal combustion engine and the transmission so as to be connected to the crank shaft as in the hybrid vehicle drive apparatus mentioned above, since the aluminum housing is heated in the same manner as in the case of fixing the steel stator to the aluminum housing due to the heat generated by the internal combustion engine during a driving operation of the vehicle a fitting state between both elements is loosened and the fixing method mentioned above canont be employed.

SUMMARY OF THE INVENTION

An object of the present invention is to provide a hybrid vehicle drive apparatus in which a stator of a motor used under a high temperature environment can be simply and securely fixed to a motor housing.

In order to achieve the object mentioned above, in accordance with the present invention, there is provided a hybrid vehicle drive apparatus in which an alternating current motor is connected to a crank shaft between an internal combustion engine and a transmission, wherein the alternating current motor is provided with a motor housing connected between an internal combustion engine housing and a transmission housing, a stator constituted by arranging a plurality of stator pieces so as to form a ring shape, a stator hold ring having an opening portion corresponding to an outer peripheral shape of the stator and structured such that the stator is press-fitted to the opening portion, and fixing means for fixing the stator hold ring to the motor housing, and wherein a coefficient of thermal expansion of the stator substantially coincides with a coefficient of thermal expansion of the stator hold ring.

In accordance with the feature mentioned above, since the coefficients of thermal expansion of the stator and the stator hold ring substantially coincide with each other, a looseness is not generated in the connecting portion between the stator and the stator hold ring even when the motor is heated due to the heat generated by the internal combustion engine during the driving operation of the vehicle. Since the stator hold ring and the motor housing are fixed by the suitable fixing means utilizing no thermal expansion and compression, it is possible to easily and securely fix the stator of the motor used under a high temperature environment to the motor housing.

DETAILED DESCRIPTION OF THE PREFERRED EMBODIMENTS

Figure 1:
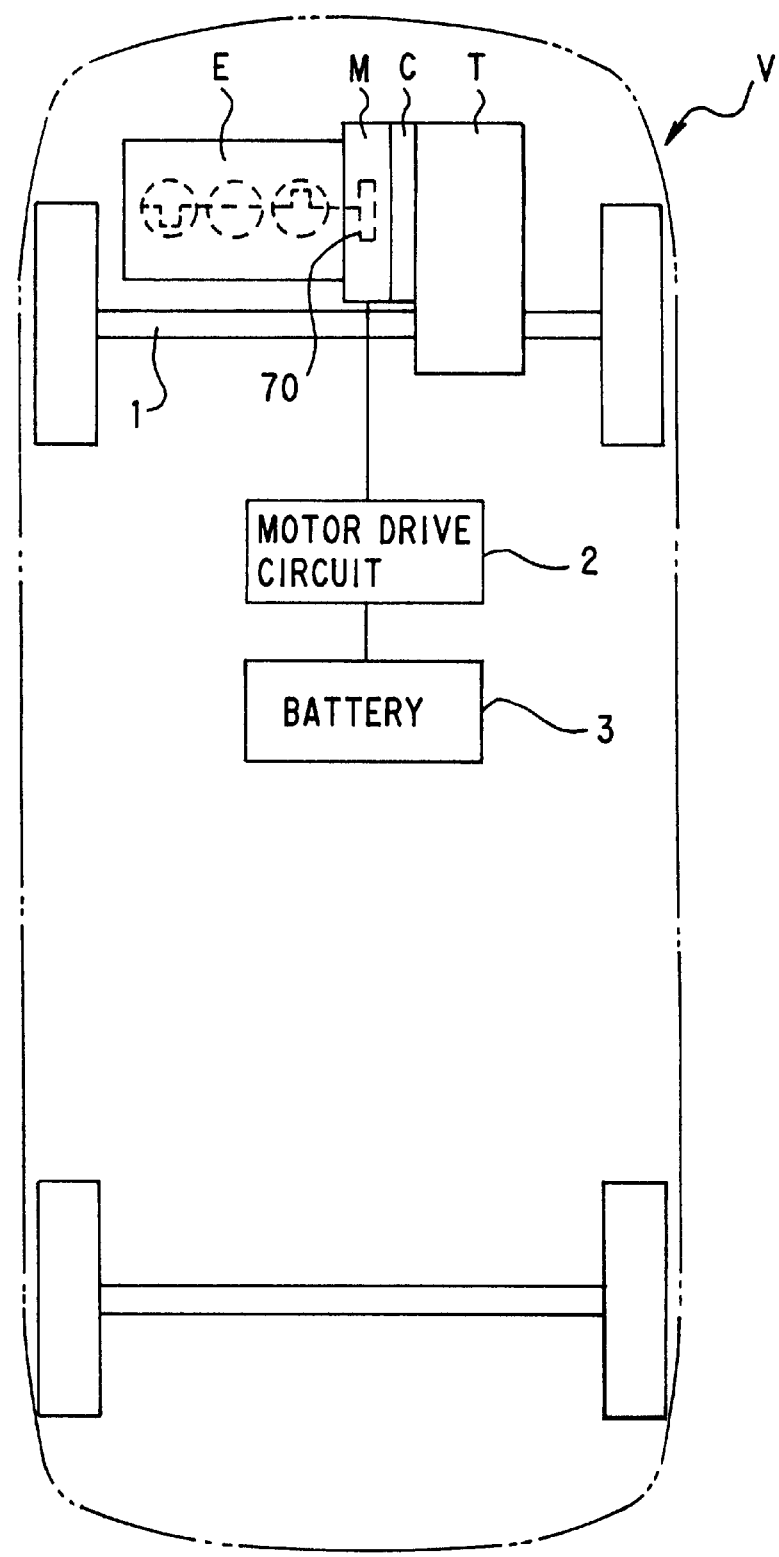
FIG. 1 is a schematic diagram showing a hybrid vehicle V to which a hybrid vehicle drive apparatus in accordance with the present invention is applied.

FIG. 1 is a schematic diagram showing a hybrid vehicle V to which a hybrid vehicle drive apparatus in accordance with the present invention is applied.

The hybrid vehicle V in accordance with the present embodiment is provided with an internal combustion engine E generating a drive force by burning gasoline, a motor M assisting an output of the internal combustion engine E, a clutch mechanism C including a flywheel, and a transmission T transmitting a drive force generated by the internal combustion engine E and/or the motor M to a drive shaft 1. As the transmission T, a well-known manual transmission, automatic transmission or other type of transmission can be employed.

The motor M is a three-phase alternating current type synchronous motor and is structured such as to assist an output of the engine at a time of accelerating or the like and charge a battery 3 due to a regenerative braking function at a time of reducing a speed of a vehicle. The motor drive circuit 2 converts an output voltage (a direct current) of the battery 3 into an alternating current voltage so as to supply each of the phases of the alternating current motor M. The engine E is controlled by engine control means (not shown).

Figure 2:
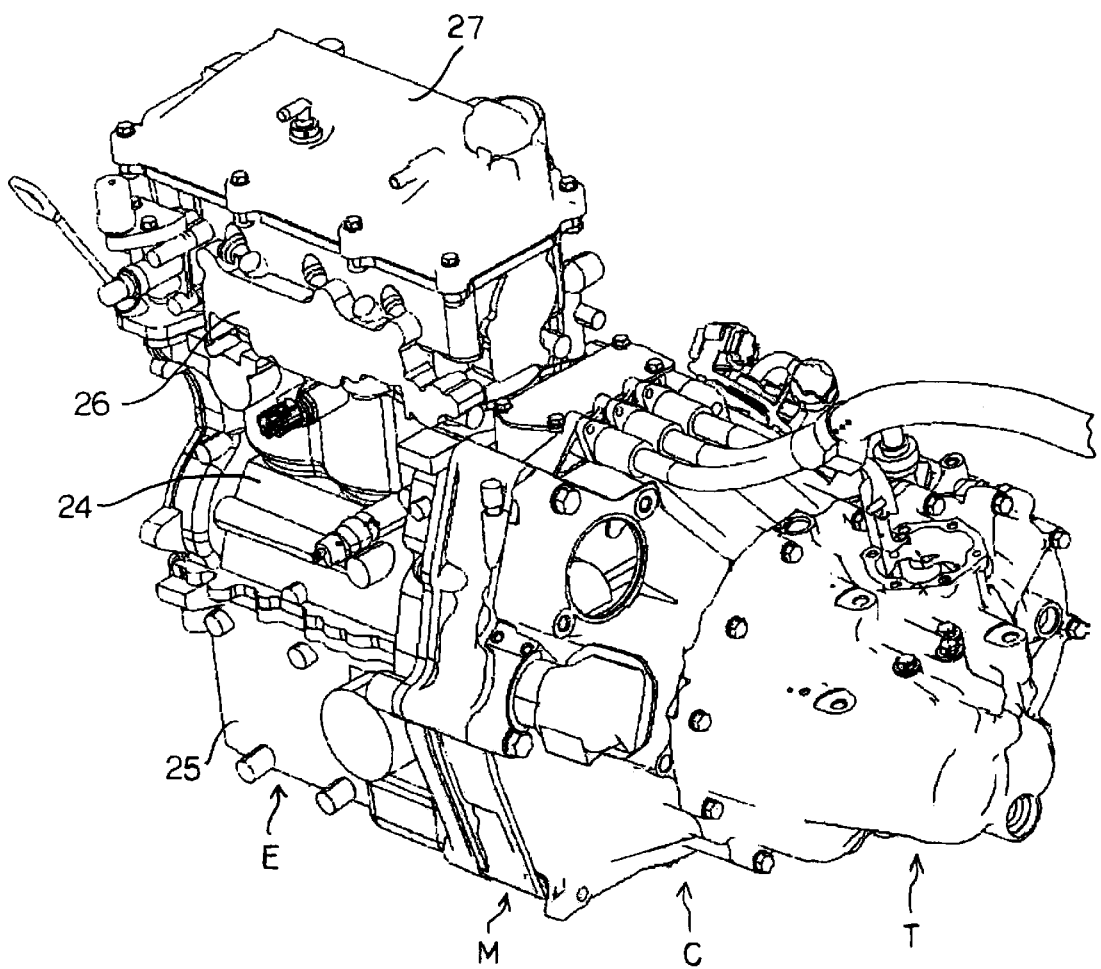
FIG. 2 is a perspective view of a hybrid vehicle drive apparatus.

FIG. 2 is a perspective view of the hybrid vehicle drive apparatus. The internal combustion engine E comprising three cylinders is constituted by an oil pan 25, a cylinder block 24 and a cylinder head 26. A head cover 27 is mounted to an upper portion of the cylinder head 26.

Figure 3:
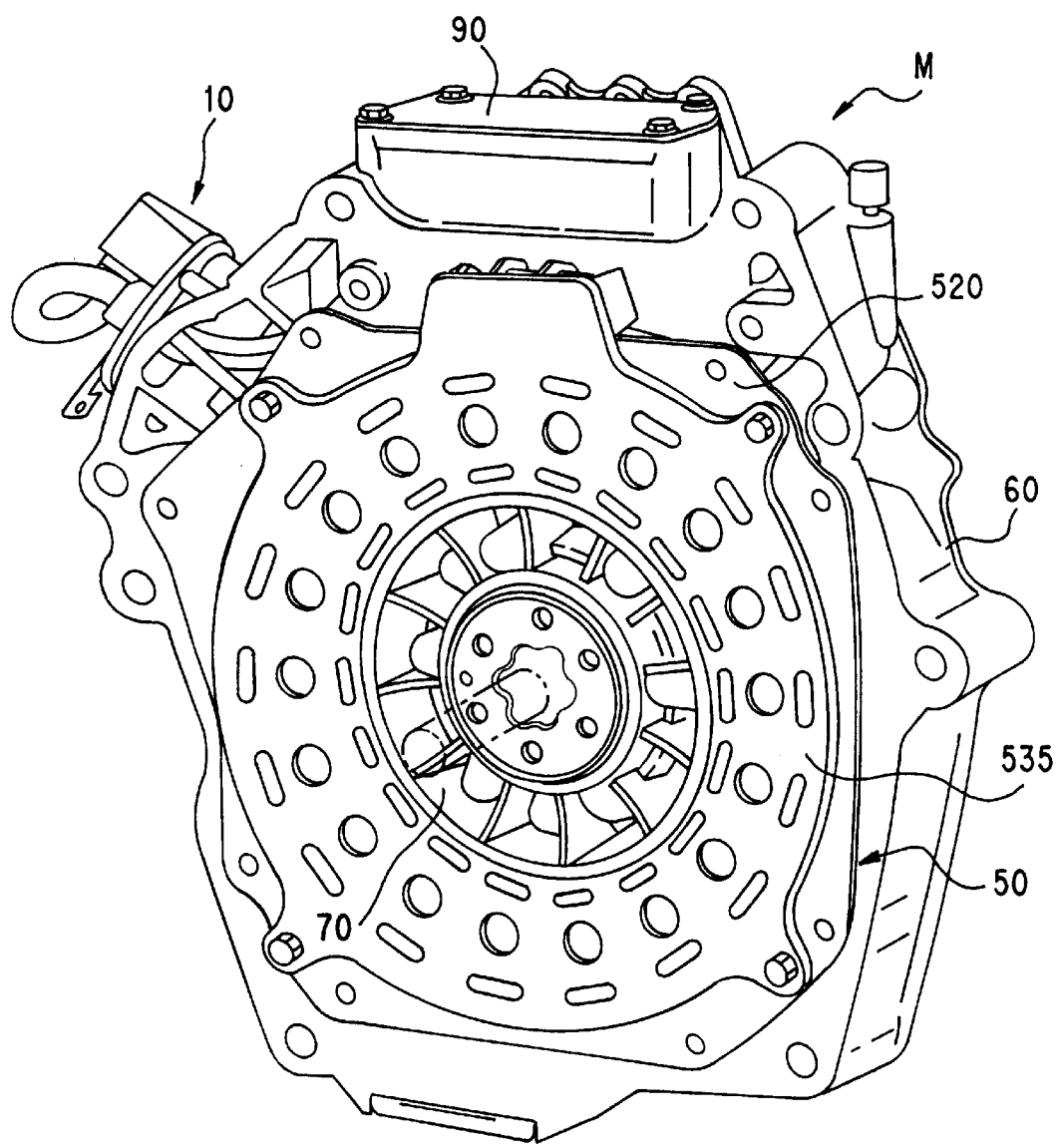
FIG. 3 is a perspective view of only a motor M as seen from an engine side.
Figure 4:
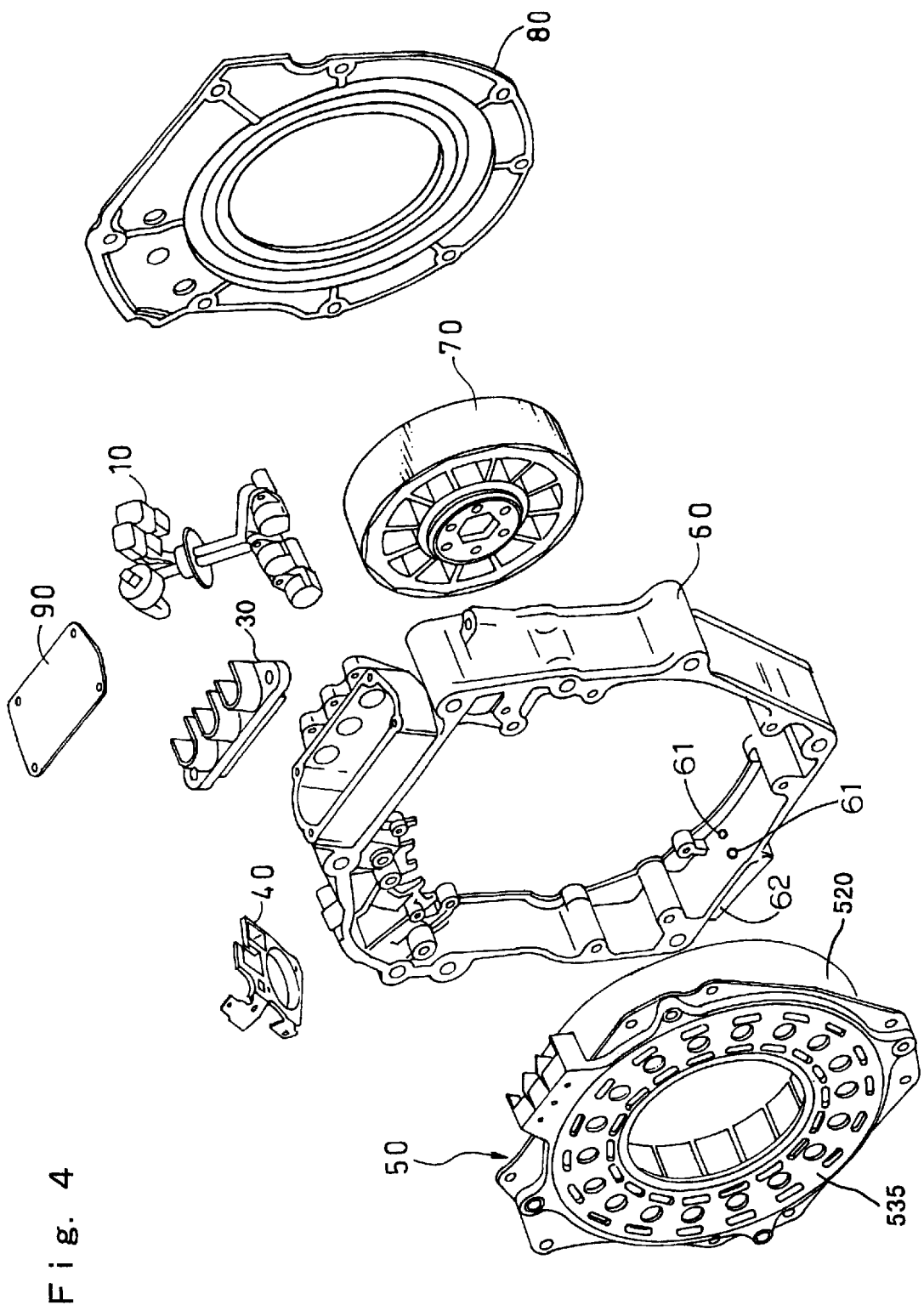
FIG. 4 is an exploded view of the motor M.
Figure 5:
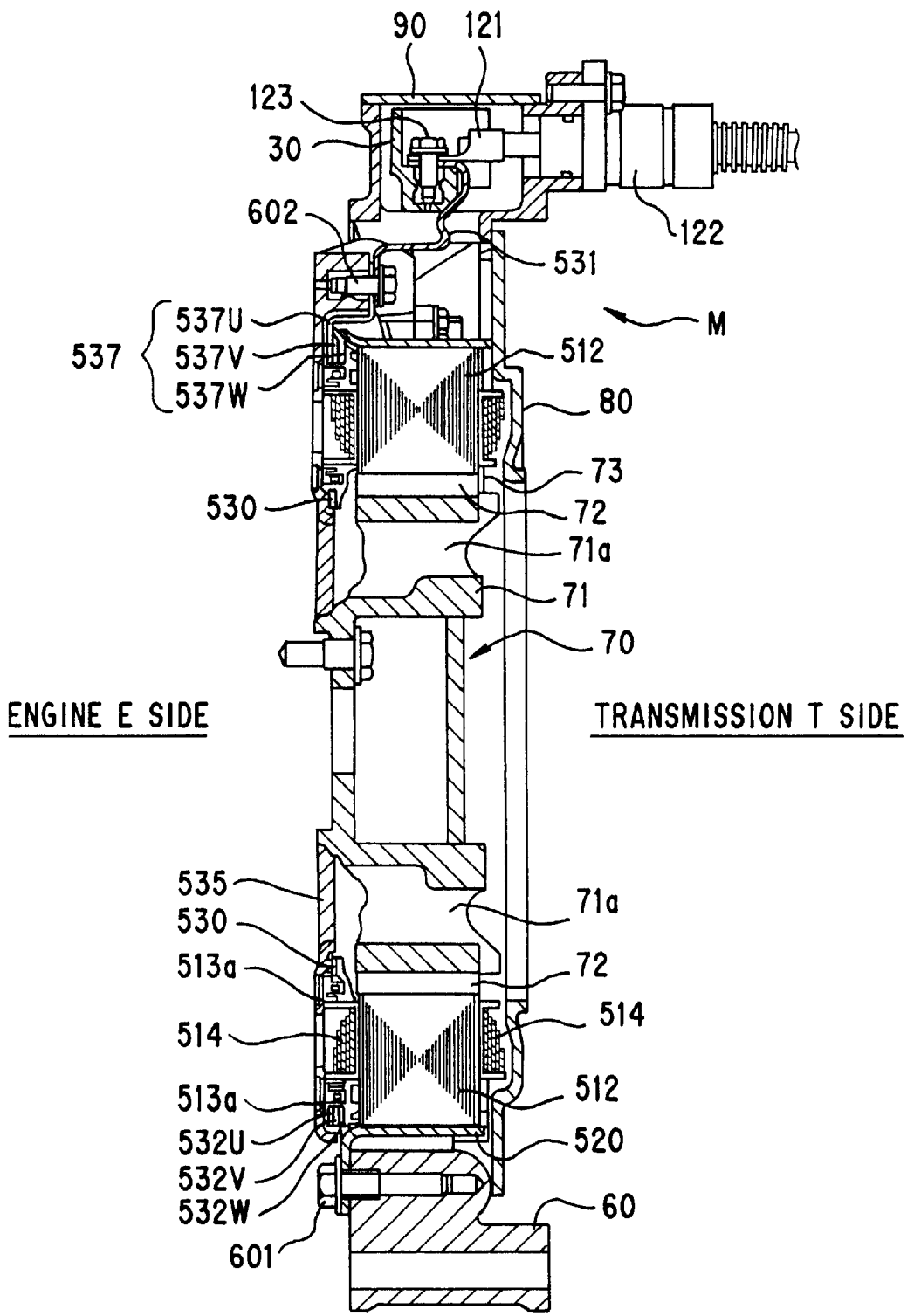
FIG. 5 is a cross sectional view of a main portion of the motor M.

FIG. 3 is a perspective view of only the motor M as seen from the engine side, FIG. 4 is an exploded view of the motor M and FIG. 5 is a cross sectional view of a main portion of the motor M.

The motor M is constituted by a stator assembly 50, a motor housing 60 receiving the stator assembly 50 and connected to the engine E, a rotor 70 directly connected to a crank shaft of the engine, a transmission side stator cover 80, a rotary sensor 10 for detecting a rotational position of the rotor 70 with respect to the stator assembly 50, a terminal holder 30, a terminal cover 90, a grommet cover 40 and the like.

A drain hole 61 for discharging water entering within the motor M to an external portion is opened in a bottom portion of the motor housing 60. A drain chamber 62 for enabling the discharge while preventing the water from entering from the external portion is formed outside the bottom portion of the motor housing 60 where the drain hole 61 passes through.

Figure 15:
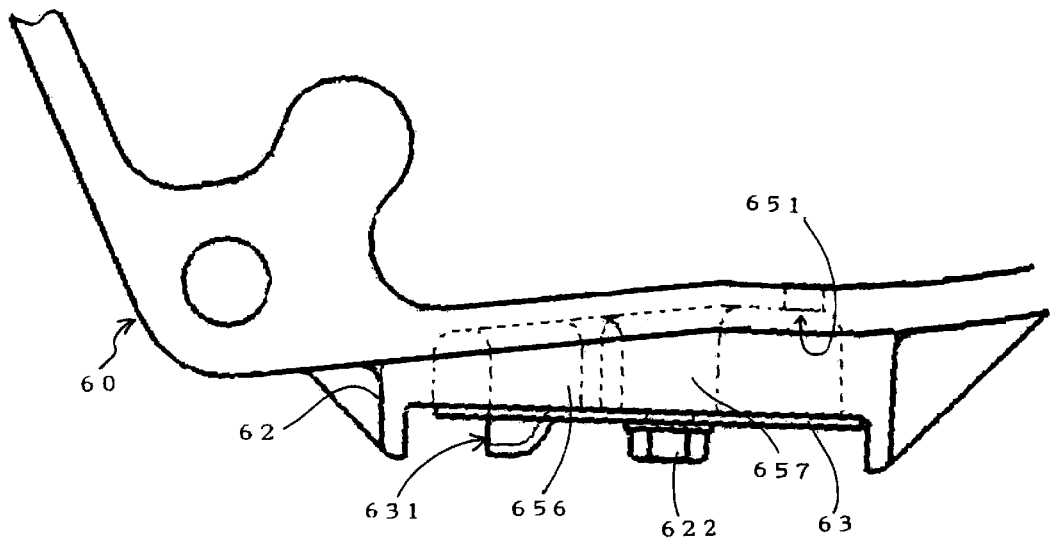
FIG. 15 is a cross sectional view of a drain chamber.
Figure 16:
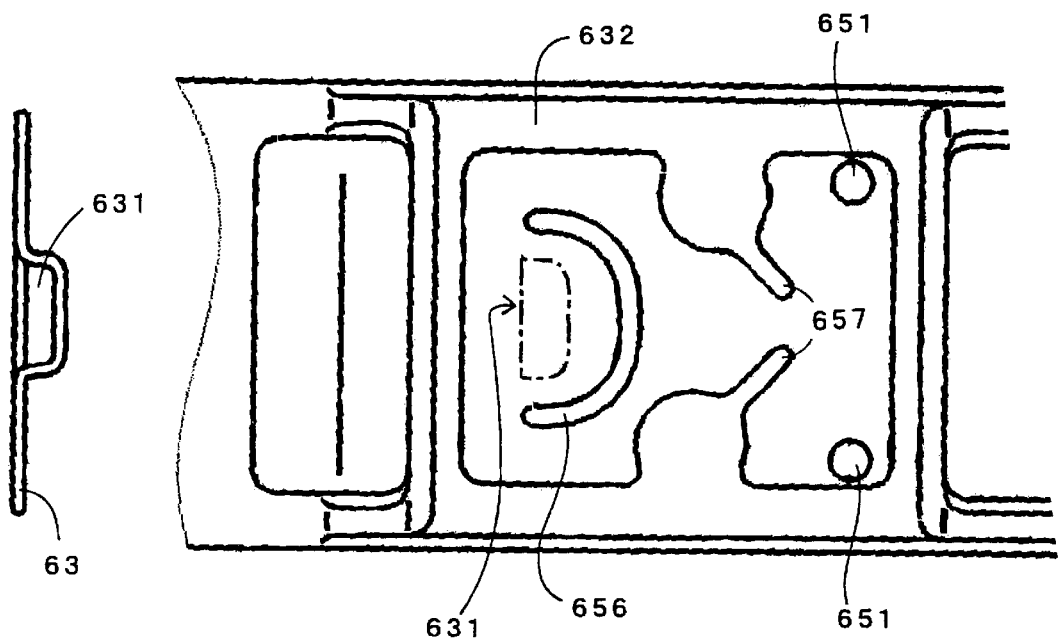
FIG. 16 is a plan view of an inner portion of the drain chamber.

FIG. 15 is a cross sectional view of the drain chamber 62 and FIG. 16 is a plan view of the drain chamber 62 as seen from a lower portion of the motor housing 60. In FIG. 16, in order to easily understand the description, drain cover 63 mentioned below is taken out as shown and only drain port 631 is shown by a broken line. A side elevational view of the drain cover 63 is described in a left side of FIG. 16.

The drain cover 63 is provided with the horizontal drain port 631 formed by cutting upward a part of a plate-like member. The drain cover 63 mentioned above is received along an edge portion 632 formed on an inner side surface of the drain chamber 62 and is fixed so as to closely seal the inner portion of the drain chamber 62 by a bolt 622.

Two drain holes 651 communicating with the drain hole 61 are opened in a top surface of the drain chamber 62, and a U-shaped protection wall 656 for protecting water flooding, having the same height as that of the edge portion 632, is formed so as to surround a projected area of the drain port 631 formed in the drain cover 63. The U-shaped protection wall 656 prevents the water from flooding into the drain chamber 62 from the drain port 631. A pair of protection walls 657 obliquely opposing to each other at a predetermined angle, are further provided between the U-shaped protection wall 656 and the drain hole 651 in such a manner as to have the same height as that of the edge portion 632 and the protection wall 656.

In accordance with the drain chamber 62 having the structure mentioned above, water flooding into the motor M is discharged from the drain chamber 62 via the drain holes 61 and 651, and further discharged to the outside from the drain port 631 of the drain cover 63. On the contrary, water flooding into the drain chamber 62 from the drain port 631 is at first prevented by the U-shaped protection wall 656 and secondly prevented by a pair of water protection walls 657. Accordingly, it is possible to discharge the water from the motor M while preventing the water from flooding into the motor M from the outside.

Figure 6:
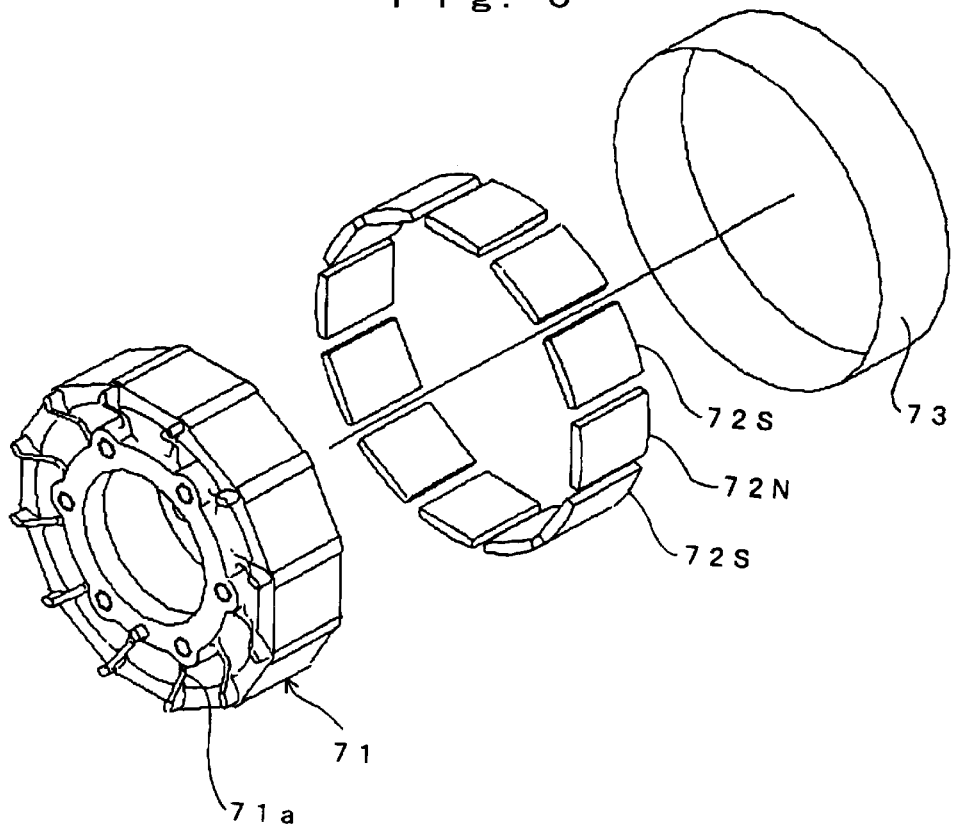
FIG. 6 is a perspective view showing a structure of a rotor.

The rotor 70 is, as shown in FIG. 6, constituted by a rotor main body 71, a plurality of N-pole and S-pole magnets 72 (72N and 72S) alternately arranged in an outer peripheral portion of the rotor main body 71 and a resin rotor cover 73 arranged so as to cover the magnets 72. A plurality of cooling fins 71a are provided on both of side surfaces of the rotor main body 71.

Figure 8:
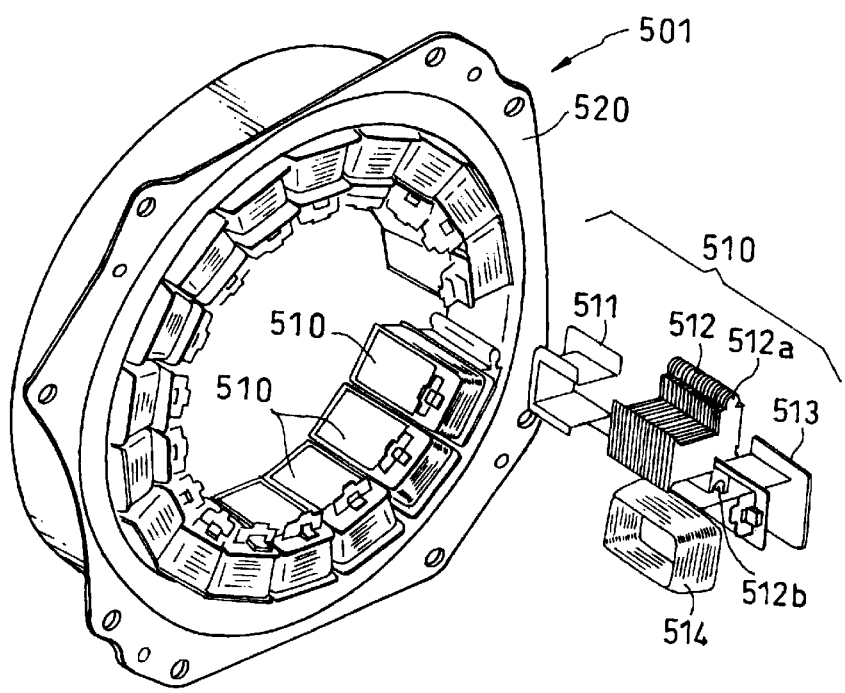
FIG. 8 is a perspective view showing an assembling method and a structure of a stator portion.
Figure 7:
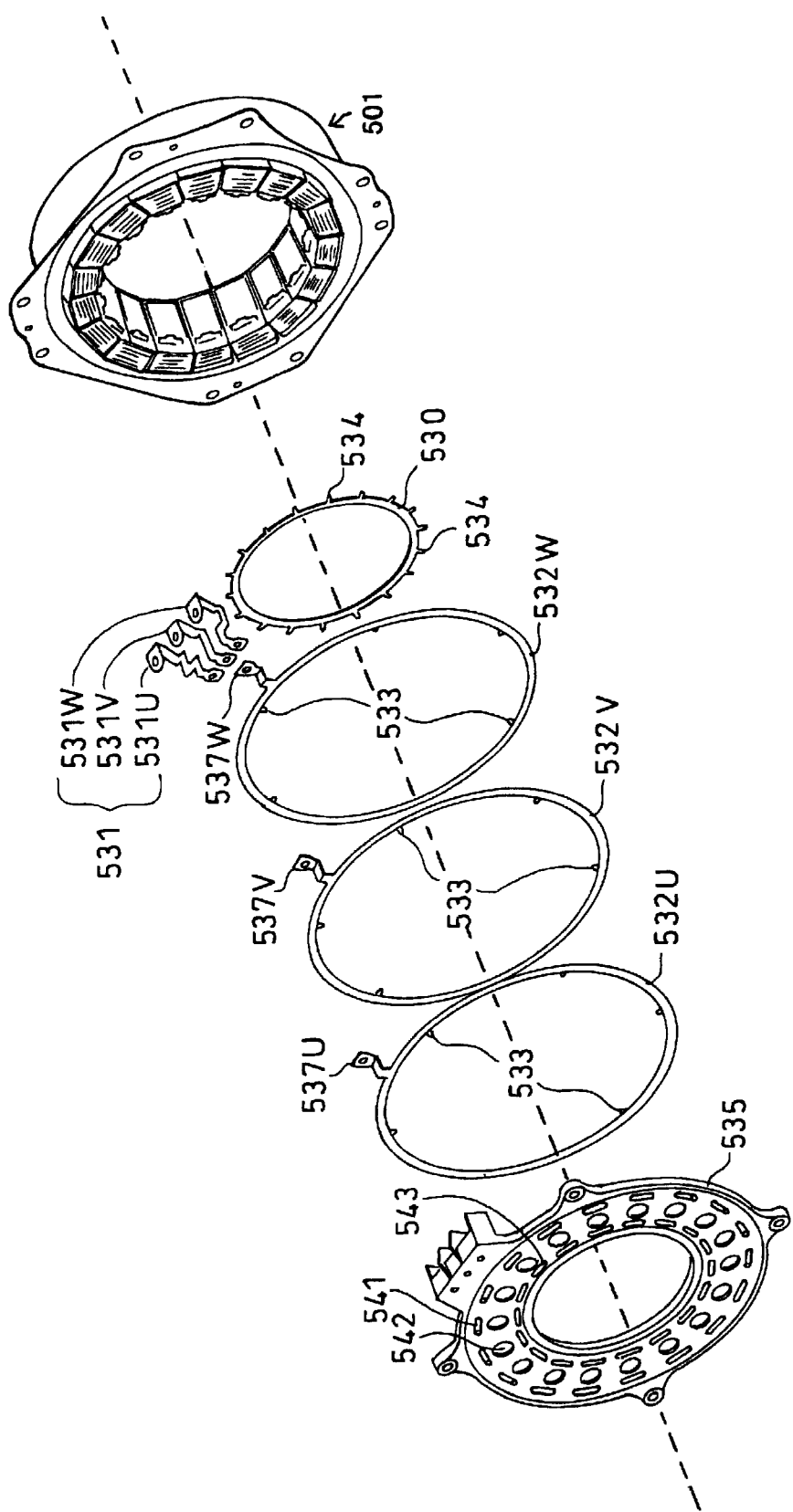
FIG. 7 is an exploded view of a stator assembly.

FIG. 7 is an exploded view of the stator assembly 50. FIG. 8 is a perspective view showing an assembling method and a structure of a stator portion 501 corresponding to a main element of the stator assembly 50.

The stator portion 501 is, as shown in FIG. 8, constituted by arranging a plurality of (18 in the present embodiment) stator pieces 510 so as to form a ring shape and press-fitting and fixing them to an opening portion of a stator hold ring 520.

Each of the stator pieces 510 is constituted by stator core teeth 512 formed by laminating substantially T-shaped silicone steel plates, a pair of bobbin-like insulators 511 and 513 oppositely arranged in such as manner as to grip a tooth portion of each stator core teeth 512 and fitted to each other, and a stator coil 514 wound around the tooth portion of each stator core teeth 512 via the bobbin-like insulators 511 and 513. The stator hold ring 520 and each stator core teeth 512 are formed by the same material or materials having substantially the same coefficient of thermal expansion so that the fitting state between both elements is not loosened due to the heat generated by the engine E during the drive operation.

The stator core teeth 512 act as a stator core at a time of arranging the stator piece 510 so as to form a ring. A semicircular convex portion 512a and a semicircular recess portion 512b are respectively formed on both end surfaces in an outer peripheral portion of the teeth 512 along a rotational axis. The convex portion 512a and the recess portion 512b of each of the T-shaped stator core teeth 512 arranged adjacent to each other are engaged with each other (refer to FIG. 10), thereby preventing each of the stator pieces 510 from being shifted toward the axial center.

Figure 9:
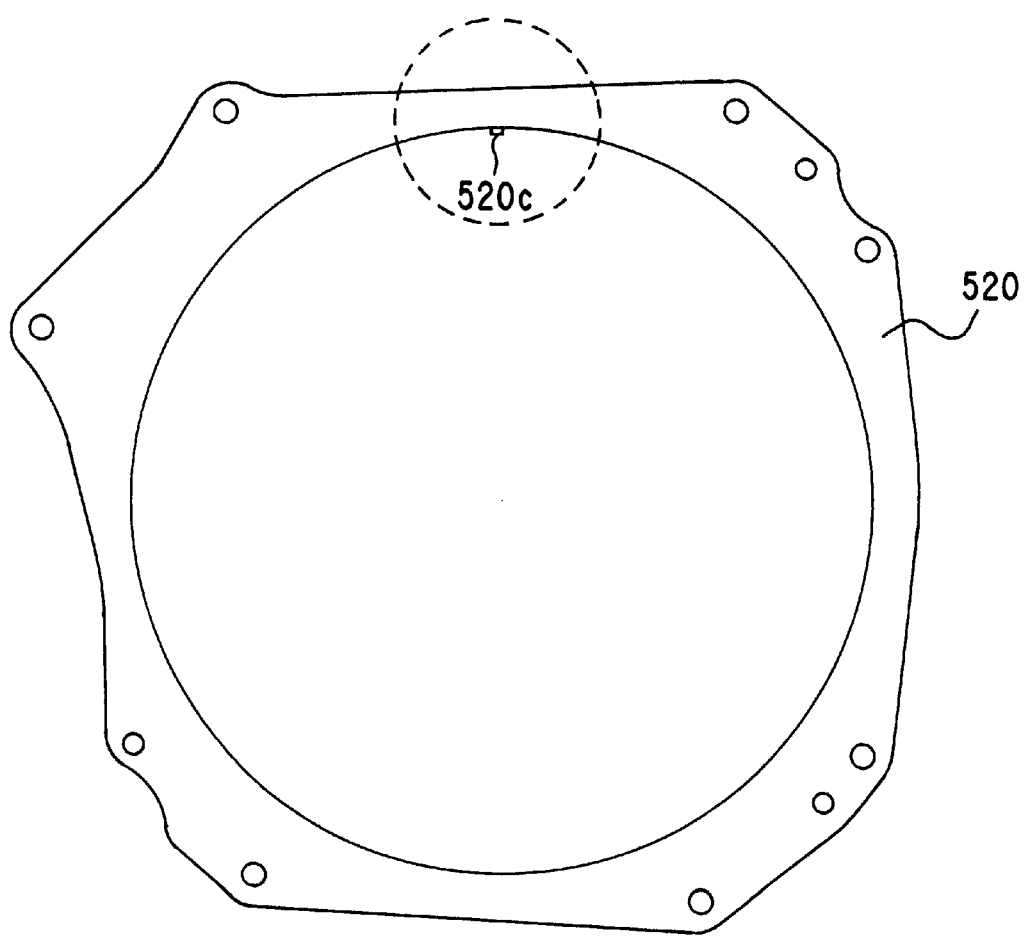
FIG. 9 is a plan view of a stator hold ring.

If a relative positional relationship between the stator pieces 510 and the stator hold rings 520 is not proper at a time of arranging the stator pieces 510 so as to form a ring shape and press-fitting and fixing the stator pieces 510 to the opening portions of the stator hold rings 520, a magnetizing timing of each of the stator pieces 510 is shifted. In accordance with the present embodiment, a convex-like engaging portion 520c for restricting a relative positional relationship between a line of the stator pieces (18 pieces of stator pieces, that is, the stator) arranged so as to form a ring shape and the stator hold ring 520, is formed at one position of the end surface of the opening portion of the stator hold ring 520, as shown in FIG. 9, in such a manner as to form a longitudinal shape along an axial direction (a direction perpendicular to a paper surface).

Figure 10:
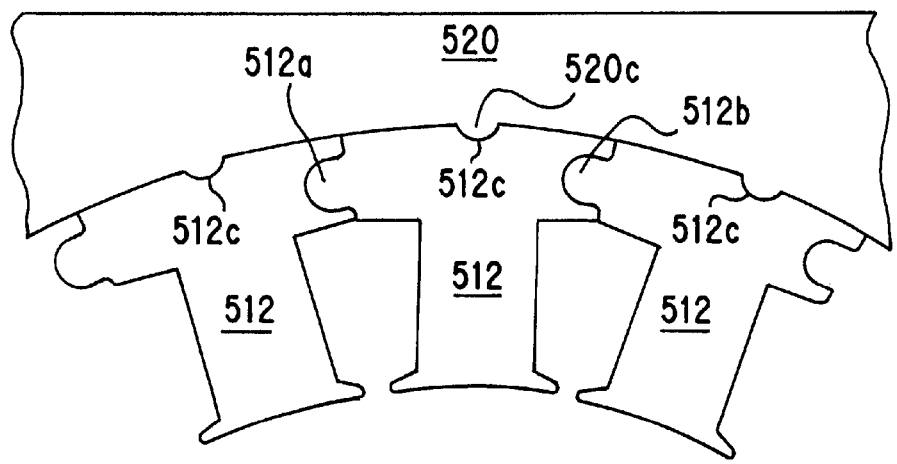
FIG. 10 is a view showing a method of positioning stator pieces to the stator hold ring.

A recess-like engaging portion 512c engaging with the convex-like engaging portion 520c is formed on a curved surface corresponding to an outer peripheral end surface when the stator core teeth 512 are arranged so as to form a ring shape, as shown in FIG. 10, in such a manner as to form a longitudinal shape along an axial direction. In FIG. 10, in order to easily understand the description, the bobbin-like insulators 511 and 513 and the stator coil 514 of the stator piece 510 and the like are omitted.

The stator pieces 510 (the stator), arranged so as to form a ring shape, are positioned and press-fitted to the stator hold ring 520 so that the recess-like engaging portion 512c formed on the outer peripheral end portion of any one of the stator pieces 510 is engaged with the convex-like engaging portion 520c formed on the end surface of the opening portion of the stator hold ring 520.

In accordance with the present embodiment, since the engaging means 512c and 520c engaging with each other are provided in both the stator side and the stator hold ring 520, both elements can be easily and accurately positioned.

Figure 13:
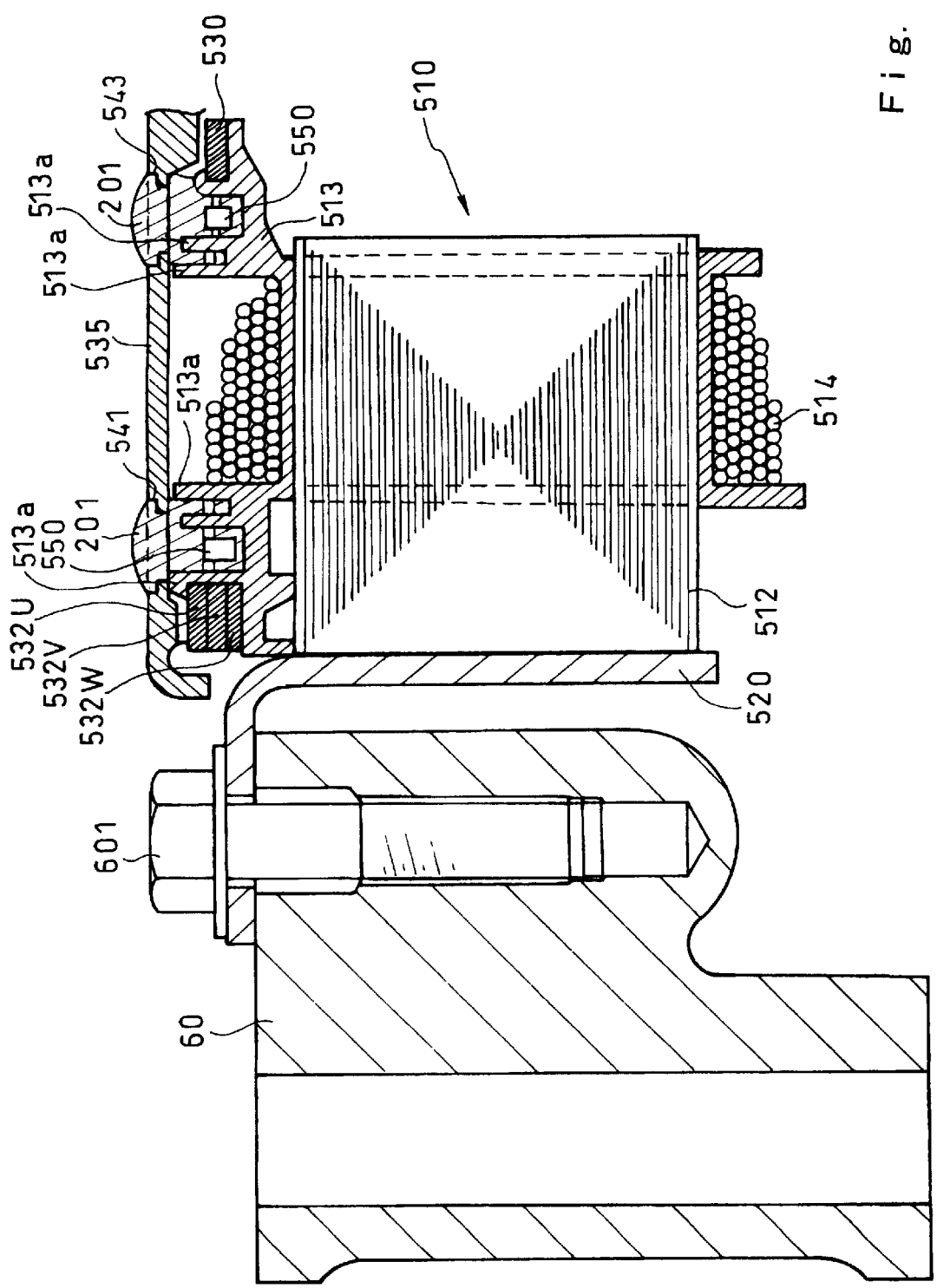
FIG. 13 is a cross sectional view of a main portion of the stator assembly.

When the press-fit of the stator pieces 510 to the stator hold ring 520 is completed and the stator portion 501 is completely assembled, a middle point connecting bus ring 530 (a second ring-like bus) for connecting other ends 514b (mentioned below) of the stator coils 514 to each other, a bus ring (a first ring-like bus) 532U for supplying a magnetizing current to all of stator coils 514U wound around U-phase stator pieces, a bus ring 532V for supplying a magnetizing current to all of stator coils 514V wound around V-phase stator pieces, and a bus ring 532W for supplying a magnetizing current to all of stator coils 514W wound around W-phase stator pieces, as shown in FIG. 7, are set to the end surface of the bobbin-like insulator 513 as shown in FIG. 13.

A plurality of partition walls 513a are stood on the engine side end surface of the bobbin-like insulator 513, as shown in FIGS. 5 and 13. The bus rings 532U, 532V and 532W are respectively piled up and set at a predetermined position sectioned by the partition plate 513a. A current supplying terminal 537 (537U, 537V and 537W) is formed at one portion in each of the bus rings 532U, 532V and 532W, as shown in FIGS. 5 and 7. Each of the current supplying terminals 537 is introduced to the terminal holder 30 via a bus bar 531 (531U, 531V and 531W) for supplying a drive current to each of the bus rings 532U, 532V and 532W. Each of the current supplying terminals 537 and each of the bus bars 531 are commonly fastened to a stator cover 535 (mentioned below) by a bolt 602.

A terminal 121 of a current supply line 122 and one end of the bus bar 531 are commonly fastened by a bolt 123 within the terminal holder 30. An opening portion of the terminal holder 30 is covered by the terminal cover 90.

A plurality of projection-like terminals 533U, 533V and 533W are formed in the respective inner peripheral end portions of the bus rings 532U, 532V and 532W toward a center as shown in FIG. 7, and a plurality of projection-like terminals 534 are formed in a radial direction from the outer peripheral end portion of the middle point connecting bus ring 530. An insulating resin is uniformly coated on an exposing surface except a main portion of each of the projection-like terminals 533 and 534 of each of the bus rings 532 and 530. As the insulating resin material, a fluorocarbon resin is preferable for the reason that the friction resistance is small and the film strength is strong in addition to the function of the insulating film.

Figure 11:
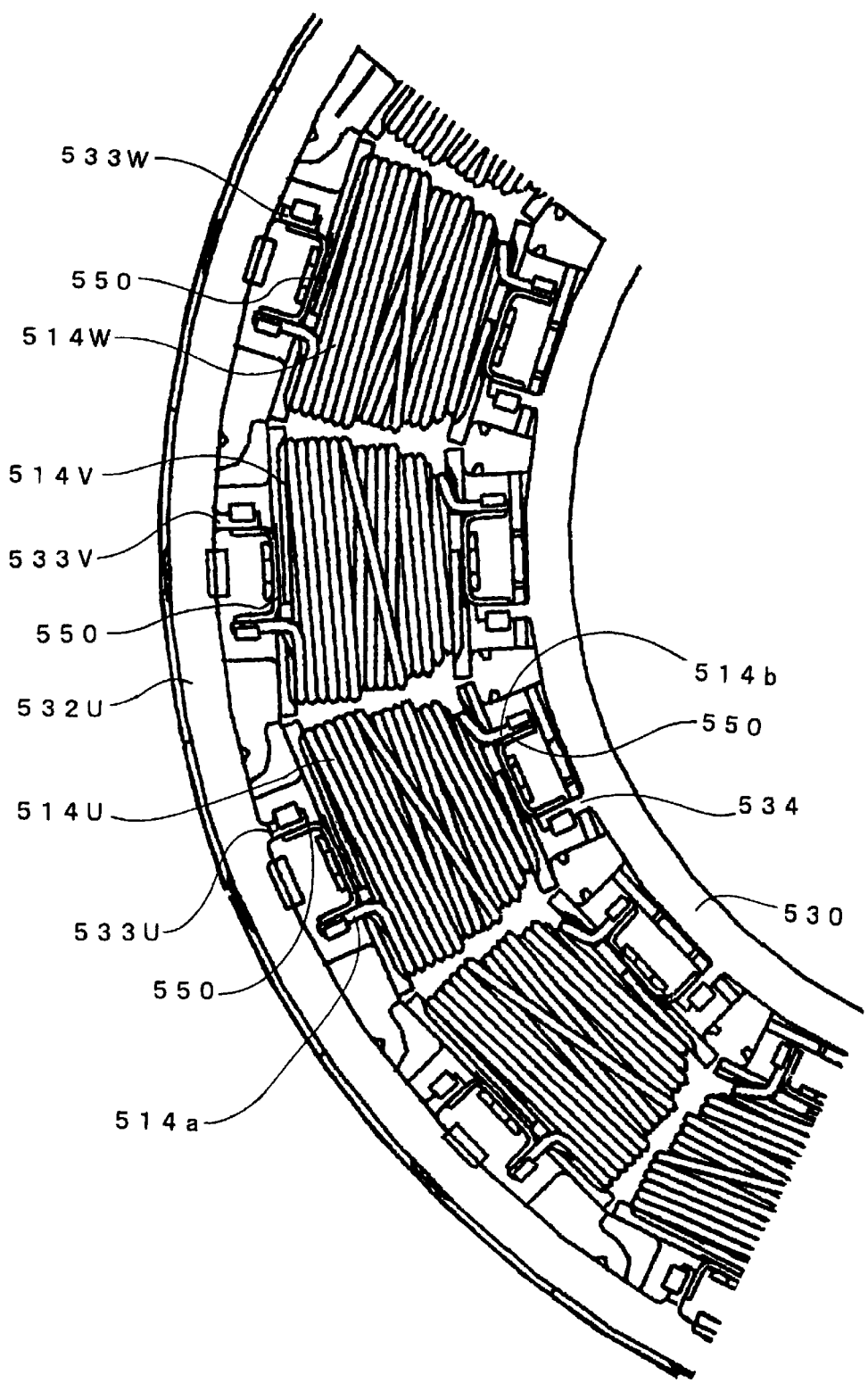
FIG. 11 is a plan view of the stator assembly.

Each of the projection-like terminal 533U of the bus ring 532U is gripped in one end of a terminal 550 corresponding to a connecting terminal, as shown in FIG. 11. One end 514a of the stator coil 514U wound around the U-phase stator piece is gripped in another end of the terminal 550. Accordingly, one end 514a of the stator coil 514U wound around each of the U-phase stator pieces arranged so as to be two pieces apart from each other is commonly connected to the adjacent one end 514a thereof via the bus ring 532U.

One end 514a of the stator coil 514V wound around each of the V-phase stator pieces is commonly connected to the adjacent one end 514a thereof via the bus ring 532V (and the terminal 550). One end 514a of the stator coil 514W wound around each of the W-phase stator pieces is commonly connected to the adjacent one end 514a thereof via the bus ring 532W (and the terminal 550).

On the contrary, each of the projection-like terminals 534 of the middle point connecting bus ring 530 is gripped in one end of the terminal 550, in the same manner as shown in FIG. 11. Another end 514b of the stator coil wound around each phase of stator pieces is gripped in another end of the terminal 550. Accordingly, other ends 514b of the stator coil 514 wound around all of the stator pieces are commonly connected to each other via the bus ring 530 (and the terminal 550). That is, the bus ring 530 corresponds to a neutral point of a star connection.

As mentioned above, in accordance with the present embodiment, the stator is constituted by arranging the stator pieces 510 so as to form a ring, the stator coils 514 wound around the respective stator pieces 510 are respectively independent from each other, and the stator coils wound around the same-phase stator piece are connected to each other by the first bus ring 532. Accordingly, each of the stator pieces 510 can be singly treated including the stator coil 514, and a treating performance and a productivity for completely assembling the stator can be improved.

Further, in accordance with the present embodiment, since the bus ring 532 corresponding to the current supply line to each of the phases is arranged outside and the second bus ring corresponding to the neutral point of each of the phases is arranged inside, the current supply line and the neutral point do not cross to each other and it is easy to arrange the wiring.

When the connection of the stator coil is completed as mentioned above, the coil is covered by the stator cover 535 and screwed to the stator assembly 50. The stator assembly 50 is screwed to the motor housing 60 by the bolt 601 as shown in FIG. 5.

As mentioned above, in accordance with the present embodiment, the stator and the stator hold ring 520 fitted by the press-fit have substantially the same coefficient of thermal expansion. Accordingly, even when the motor is heated due to the heat generated by the internal combustion engine during the drive of the vehicle, no looseness is generated in the connection portion between the stator and the stator hold ring. Further, since the stator hold ring 520 and the motor housing 60 are screwed and fixed to each other, it is possible to easily and securely fix the stator of the motor used under a high temperature environment to the housing 60.

A plurality of first long holes 541 arranged along a circumferential direction, a plurality of round holes 542 arranged along a circumferential direction inside the first long hole, and a plurality of second long holes 543 arranged along a circumferential direction inside the round hole, are provided on the stator cover 535 in this order from the outer peripheral portion, as shown in FIG. 7.

Figure 12:
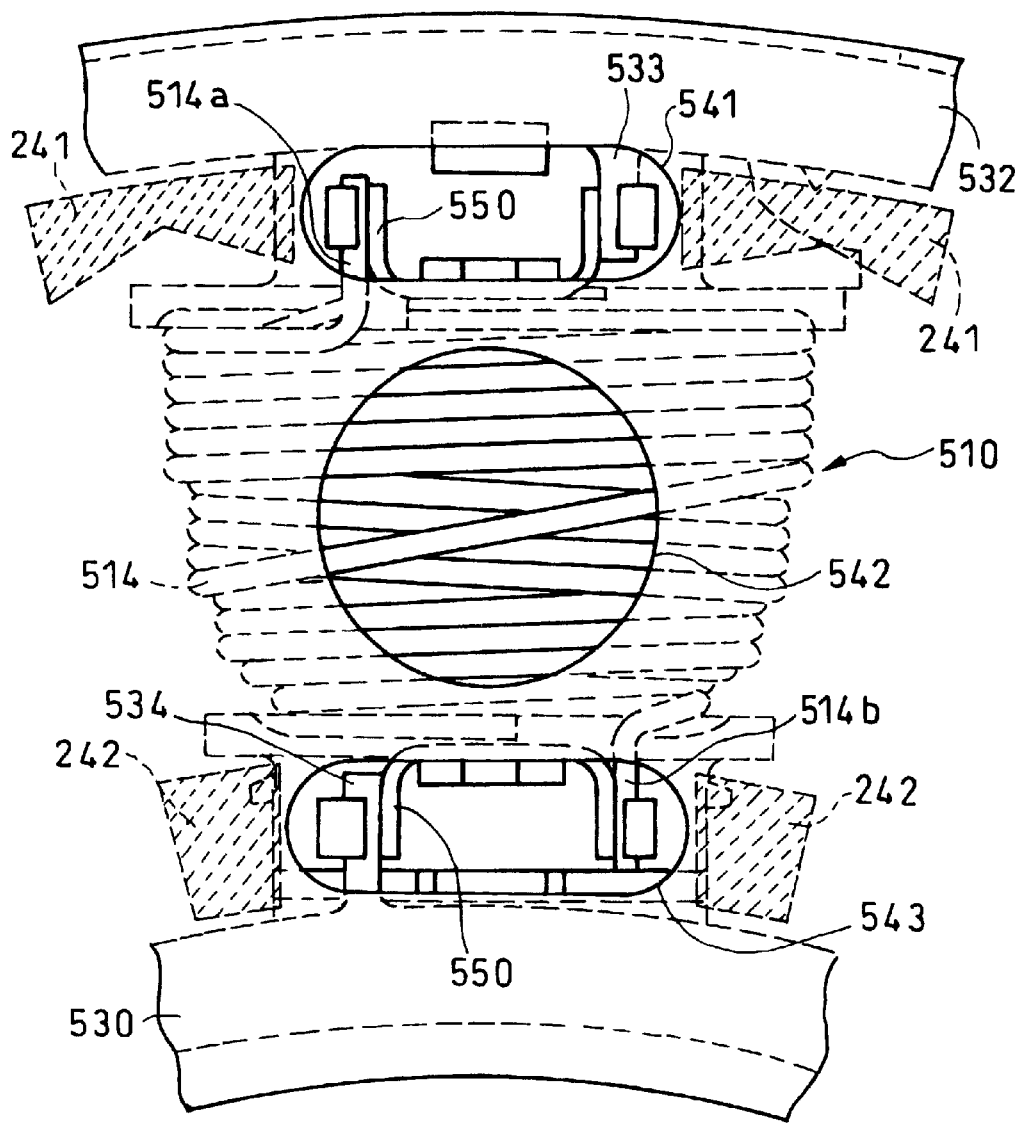
FIG. 12 is a view showing a method of connecting stator coils to a bus ring.

FIG. 12 is a view showing a relative positional relationship between each of the long holes 541 and 543 and the round holes 542 on the stator cover 535 and the stator piece 510. The connecting portions between the terminal 550 and the projection-like terminal 533 of each of the bus rings 532 and stator coil one end 514a are exposed from the first long hole 541, and the connecting portions between the terminal 550 and the projection-like terminal 534 of each of the bus rings 530 and stator coil another end 514b are exposed from the second long hole 543.

Figure 14:
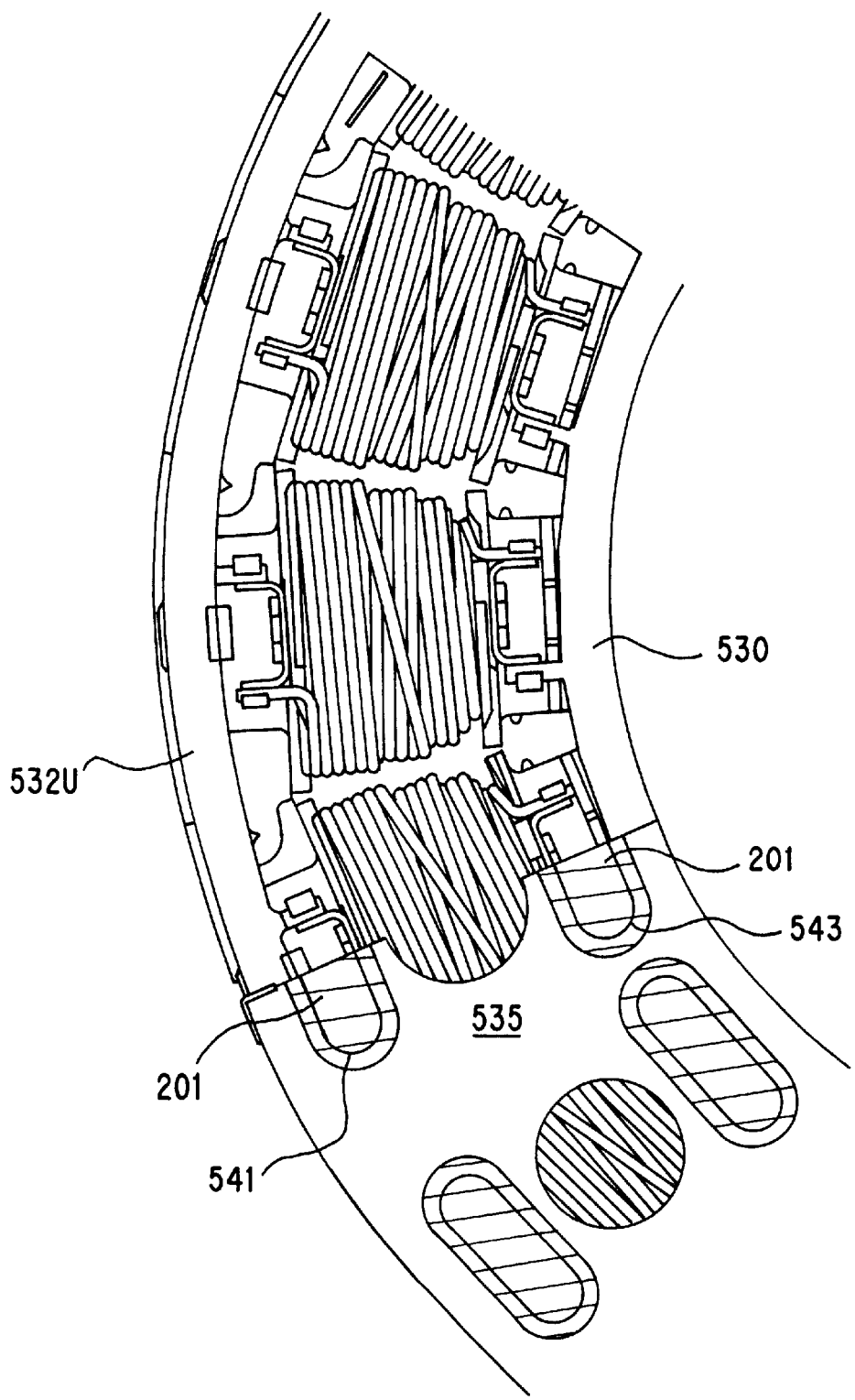
FIG. 14 is a partly broken plan view of the stator assembly.

In accordance with the present embodiment, as shown in a cross sectional view in FIG. 13 and a partly broken plan view in FIG. 14, a seal agent 201 is charged into the stator from each of the long holes 541 and 543 and each of the connected portions (the gripped portion) is sealed. For example, a thermosetting silicone resin can be employed for the seal agent 201, and the seal agent 201 is hardened by being heated in an electric furnace or the like after being charged.

In accordance with the present embodiment, as shown in FIG. 12, projections 241 and 242 are respectively stood from back surfaces of both end portions along a circumferential direction of the respective long holes 541 and 543 of the stator cover 535. Accordingly, the seal agent 201 charged from each of the long holes 541 and 543 is prevented from being flowed out in a circumferential direction by each of the projections 241 and 242. The seal agent is prevented from flowing out in a radial direction and toward the center by a plurality of partition plates 513a stood from the engine side end surface of the insulator 513 and the end surface of the laminated bus ring 532, as shown in FIG. 13.

In accordance with the present invention, since the partition plate 513a stood from the bobbin-like insulator 513 is utilized as a flow stopper for the seal agent 201, it is possible to efficiently prevent the seal agent 201 from flowing out without increasing the number of parts.

In accordance with the present invention, the following effects can be achieved.

(1) Since the coefficients of thermal expansion of the stator and the stator hold ring substantially coincide with each other, a looseness is not generated in the connecting portion between the stator and the stator hold ring even when the motor is heated due to the heat generated by the internal combustion engine during the driving operation of the vehicle. Since the stator hold ring and the motor housing are fixed by the suitable fixing means utilizing no thermal expansion and compression, it is possible to easily and securely fix the stator of the motor used under a high temperature environment to the housing.

(2) Since the engaging means engaging with each other are provided in both of the stator piece and the stator hold ring, it is possible to easily and accurately position both of the elements.

What is claimed is:

1. A hybrid vehicle drive apparatus in which an alternating current motor is connected to a crank shaft between an internal combustion engine and a transmission,
wherein said alternating current motor comprises:
a motor housing connected between the internal combustion engine and the transmission;
a stator constituted by arranging a plurality of stator pieces so as to form a ring shape, each of said stator pieces is constituted by stator core teeth;
a stator hold ring having an opening portion corresponding to an outer peripheral shape of said stator core teeth arranged so as to form a ring shape and structured such that said stator is press-fitted to said opening portion and contacts the outer peripheral shape of said stator core teeth; and
fixing means for fixing said stator hold ring to said motor housing, and
wherein a coefficient of thermal expansion of said stator core teeth substantially coincides with a coefficient of thermal expansion of said stator hold ring so that a fitting condition between the outer peripheral shape of said stator core teeth and said opening portion is not loosed by the temperature change of said stator core teeth and said stator hold ring.

2. A hybrid vehicle drive apparatus according to claim 1, wherein each of said stator pieces is provided with one of recess-shaped and convex-shaped engaging means on a surface constituting an outer peripheral end surface when being arranged so as to form a ring shape, and said stator hold ring is provided with another of said recess-shaped and convex-shaped engaging means on at least one of said opening portion end surfaces, and
wherein said ring-like arranged stator pieces are positioned in said opening portion of said stator hold ring so that one of said engaging means formed on any outer peripheral end surface is engaged with another of the engaging means formed in said stator hold ring.

* * * * *